July 22, 1969   R. P. NORTHUP   3,456,502
REENTRY SIMULATION
Filed Dec. 22, 1966

INVENTOR.
ROBERT P. NORTHUP
BY *R H Quist*
ATTORNEY.

United States Patent Office 3,456,502
Patented July 22, 1969

3,456,502
REENTRY SIMULATION
Robert P. Northup, Round Lake, N.Y., assignor to General Electric Company, a corporation of New York
Filed Dec. 22, 1966, Ser. No. 603,979
Int. Cl. G01m 9/00
U.S. Cl. 73—147                9 Claims

ABSTRACT OF THE DISCLOSURE

A facility for simulating the conditions experienced by a body reentering the earth's atmosphere from space. Materials and models of vehicle shapes are placed in the exhaust of a rocket engine. High stagnation pressures are achieved by enclosing the exhaust nozzle and model in a large chamber having an exit nozzle to control the escape of the gases and thereby build up pressure within the chamber.

Background of the invention

This invention relates to a facility which will simulate reentry conditions for testing materials for reentry vehicles and models of reentry vehicle shapes.

The extreme conditions of heat and pressure encountered by an object entering the atmosphere of the earth from space have presented difficult problems for the designers of so-called reentry vehicles. Similar, although generally less harsh, environments occur when aircraft are propelled at supersonic speeds within the atmosphere.

It would be desirable to evaluate the effectiveness of proposed reentry vehicle designs and materials in actual flight tests; however, the difficulty of obtaining performance data and the expense of such tests limit their use. The generally accepted alternative is a testing facility on the ground which simulates, to the extent possible, reentry conditions. The conditions of temperatures, Mach numbers, gas characteristics, and stagnation pressures (the pressure on the nose of the body), are of such a magnitude that no existing test facility comes close to simulating all of them. In addition, models of reentry vehicles rather than full scale vehicles are usually tested to reduce the size of the test facility required.

A previous approach to such as simulation facility involves the use of a rocket engine. The model or material to be tested is supported in the exhaust of the rocket engine where it is exposed to the hot gases. The mass flow with this approach is high, and the flow field has a larger cross-sectional area (permitting the testing of larger models), than other types of test facilities. Temperature and stagnation pressures are only moderate compared to the actual conditions.

In order to provide a uniform, shock-free flow field, a Busemann or "shockless" nozzle is utilized. A shockless flow is achieved with such a nozzle by making the nozzle exit pressure equal to the ambient pressure. With a particular nozzle only one fuel consumption rate will provide this desired nozzle exit pressure so that it is impossible to vary the simulated conditions without changing the nozzle. By changing the nozzle a higher combustion chamber pressure can be generated to produce a shockless flow field of higher velocity and increased stagnation pressure; however, a relatively large increase in combustion chamber pressure produces only a small increase in stagnation pressure. For example, when the combustion chamber pressure is increased from 300 p.s.i.a. to 2000 p.s.i.a. the stagnation pressure is increased from 110 p.s.i.a. to 218 p.s.i.a. To achieve a stagnation pressure of 280 p.s.i.a. would require a combustion chamber pressure of 5000 p.s.i.a. While the 2000 p.s.i.a. combustion chamber pressure is within the state of the art for thrust chambers, the 5000 p.s.i.a. combustion chamber pressure is not a practical solution.

Summary

It is an object of this invention to provide a reentry simulator of the rocket engine exhaust type having highly improved stagnation pressures and increased mass flows.

In a preferred form of the invention, a rocket engine nozzle is exhausted into one end of a test chamber having an exit nozzle at the other end. The test specimen (which may be a model or material) is mounted on a support which can be moved to position the model in the rocket exhaust as desired.

Description of the preferred embodiment

Figure 1:
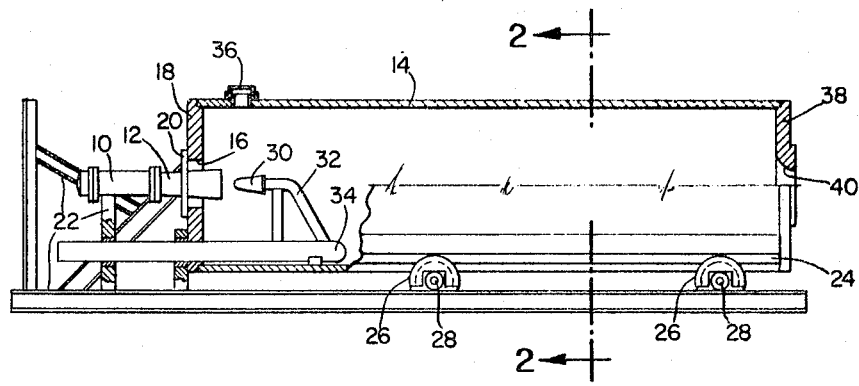
FIGURE 1 is an elevation, partially in section, of an embodiment of the invention.

As shown in FIGURE 1, rocket engine 10 is supported with exhaust nozzle 12 extending into one end of chamber 14 through port 16 in endwall 18. Shroud 20 surrounds exhaust nozzle 12 and provides a pressure tight seal for port 16 when secured to endwall 18. Shroud 20 is designed to be removed to permit substitution of other nozzles if desired.

Figure 2:
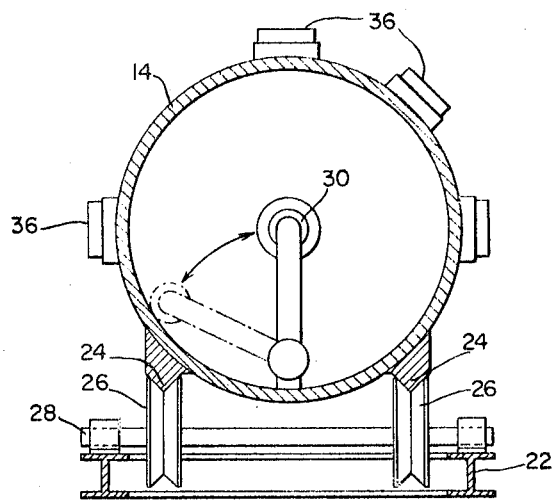
FIGURE 2 is a cross-section along the line 2—2 of FIGURE 1.

End wall 18 and rocket engine 10 are held in a fixed position by framework 22. Chamber 14, on the other hand, is secured to rails 24 (more clearly seen in FIGURE 2) which are positioned in pulleys 26. Axes 28 of pulleys 26 are secured to framework 22 so that pulleys 26 may rotate but not move longitudinally.

Test specimen 30 is secured to support 32 which is mounted on rod 34. Rod 34 may be moved longitudinally and may also be rotated to permit positioning of test specimen 30 as desired relative to exhaust nozzle 12. Suitable seals (not illustrated) are provided about rod 34 where it passes through endwall 18 to maintain the pressure tight integrity of chamber 14.

With the foregoing arrangement, chamber 14 can be moved longitudinally away from nozzle 12, endwall 18, and test specimen 30 to permit easy access to the test specimens. This is accomplished by removing the bolts or other fasteners which secure endwall 18 to chamber 14.

Observation of the test specimen while in the exhaust gas stream is provided for by one or more portholes 36 located as illustrated.

Endwall 38, at the other end of chamber 14, is equipped with exit nozzle 40 to control the flow of the exhaust gases from chamber 14.

As rocket engine 10 is operated, the exhaust gases flow out of chamber 14 at a rate dependent (in part) on the size of exit nozzle 40. In the prior art arrangement, it will be recalled, the rocket engine exhausted to the atmosphere. It was mentioned previously that a requirement for a shockless flow field is that the exhaust pressure of nozzle 12 be equal to the ambient pressure. With the present arrangement the ambient pressure can be raised to a desired level thereby permitting the exhaust pressure to be raised. The exhaust pressure increase is produced by increasing the flow of fuel to rocket engine 10 which also raises the pressure in the combusition chamber of the rocket.

The effect of this invention can be illustrated by an example. If the pressure in chamber 14 is maintained at two atmospheres or roughly 29.4 p.s.i.a., and the combustion chamber pressure is raised to a point (600 p.s.i.a.) where the exhaust nozzle pressure matches the new "ambient" pressure, the stagnation pressure on the test specimen will be doubled (220 p.s.i.a.). In the example given in the "background of the invention" an increase in combustion chamber pressure of 2000 p.s.i.a. was required to achieve a stagnation pressure of 218 p.s.i.a. With the combustion chamber pressure at 2000 p.s.i.a. using this invention, a stagnation pressure of 735 p.s.i.a. would result.

In addition to the increased stagnation pressures which can be produced, the greater fuel flow rates increase the mass flow of exhaust gases. By varying the ratio of feul to oxidizer the temperature of the exhaust gases will be varied. Also by varying the chamber pressure, varying stagnation pressures will result. Thus without changing the test setup a closer approximation to an actual reentry with varying temperatures and pressures can be achieved.

It is evident from the foregoing that by the simple expedient of providing a chamber with an exit nozzle, stagnation pressures can be achieved which would be economically impossible using state of the art rocket engines alone.

Although the description so far has been directed to the use of a liquid fueled rocket engine, a solid fuel rocket engine can also be used with this invention.

While a particular embodiment of a reentry simulator has been shown and described, it will be obvious that changes and modifications can be made without departing from the spirit of the invention.

What is claimed as new and desired to be secured by Letters Patent of the United States is:

1. A reentry simulator to provide varying stagnation pressures while maintaining a shockless flow field which comprises:
   a test chamber containing support means for a test specimen,
   inlet nozzle means for discharging gas to said chamber in a shockless flow field at the exit of said nozzle,
   separate exhaust means for maintaining a pressure within the test chamber above atmospheric pressure, and
   means for maintaining the exit pressure of the inlet nozzle and the chamber pressure approximately equal.

2. A reentry simulator as in claim 1 wherein said exhaust means is a nozzle.

3. A reentry simulator as in claim 2 wherein movable support means are provided to position the test specimen in the gas discharge as desired.

4. A reentry simulator as in claim 3 wherein observation portholes are positioned in the walls of said chamber adjacent said test specimen support.

5. A reentry simulator as in claim 4 wherein said chamber can be moved longitudinally to permit access to said test specimen.

6. A reentry simulator comprising in combination:
   a test chamber with an opening at one end for the exhaust nozzle of a rocket engine, said exhaust nozzle discharging gas to said chamber in a shockless flow field at the exit of said nozzle,
   supporting means for holding a test specimen in the exhaust gases of said rocket engine,
   an exit nozzle at the other end of the test chamber for maintaining a pressure within said test chamber above atmospheric pressure, and
   means for maintaining the exit pressure of the rocket engine exhaust nozzle and the chamber pressure approximately equal.

7. A reentry simulator as in claim 6 wherein:
   said supporting means can be moved from outside said chamber whereby said test specimen can be positioned relative to said exhaust gases as desired.

8. A reentry chamber as in claim 7 wherein:
   the chamber pressure is dependent upon the exit nozzle opening size.

9. A reentry chamber as in claim 8 wherein:
   said chamber can be moved longitudinally to permit access to said test specimen.

References Cited

UNITED STATES PATENTS

| | | | |
|---|---|---|---|
| 2,795,137 | 6/1957 | Whitener | 73—147 |
| 2,805,571 | 9/1957 | Graham | 73—147 |
| 2,910,866 | 11/1959 | Czerwinski | 73—147 |
| 3,011,341 | 12/1961 | Hill | 73—147 |
| 3,029,635 | 4/1962 | Fetz | 73—147 |
| 3,121,329 | 2/1964 | Bennett | 73—147 |

OTHER REFERENCES

"Laboratory Studies of Missile Reentry Aero-Thermodynamics, Dr. D. Bershader, from ISA Journal, November 1958, pp. 62–71.

Thermal-Arc brochure, Thermal Dynamics Corp., 4 pages, December 1963.

LOUIS R. PRINCE, Primary Examiner

JEFFREY NOLTON, Assistant Examiner